Oct. 10, 1944.  H. W. BUHLER  2,360,106
JOINT PACKING
Filed Sept. 1, 1942
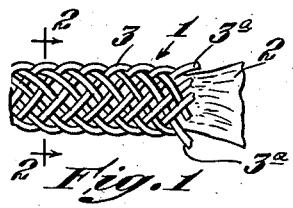
Fig.1
Fig.2
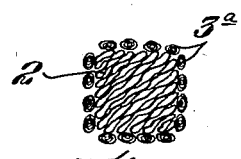
Fig.3
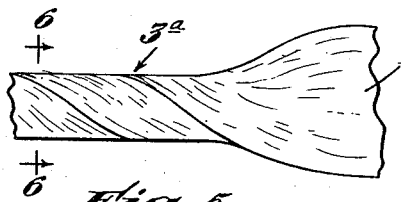
Fig.4
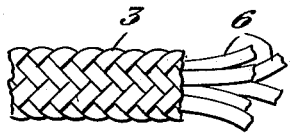
Fig.5
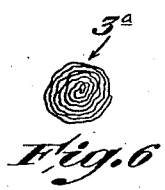
Fig.6
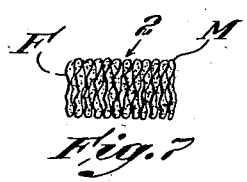
Fig.7
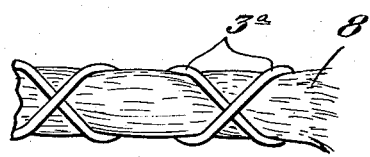
Fig.8
Fig.9
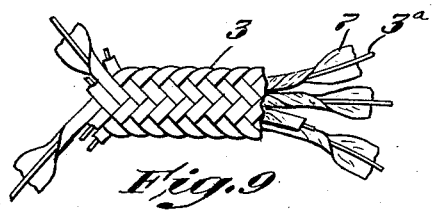
Fig.10
Fig.11
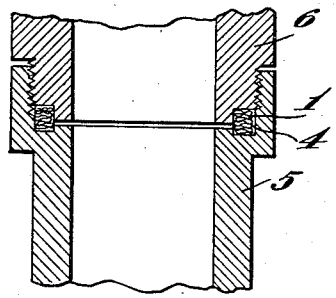
Inventor
Henry W. Buhler
by Roberts Cushman & Woodbery
att'ys.

Patented Oct. 10, 1944

2,360,106

UNITED STATES PATENT OFFICE 2,360,106

JOINT PACKING

Henry W. Buhler, Gloucester, Mass.

Application September 1, 1942, Serial No. 456,883

3 Claims. (Cl. 288—17)

This invention pertains to joint packings. One object of the invention is to provide packing which may be made cheaply and rapidly and by the use of existing types of machine; which may be made in any desired transverse dimensions and cross-sectional contours and in any reasonable length; and which will retain the desired characteristics throughout a long period of use.

In order that a joint packing may perform its intended function properly, it must be pliable, of substantially uniform cross section, transversely yieldable and preferably somewhat resilient, and mechanically tough, and resistant to physical, chemical and bacteriological factors to which it may be exposed during use. Commonly such joint packings have consisted of or comprised rubber, jute or hemp, all of which substances are at the present time difficult to obtain for such uses. Another object of the present invention is to provide joint packing having the above necessary and desirable characteristics but which may be made from material, for example paper or paper stock, which is cheap and relatively abundant.

Such joint packings are designed to prevent leakage of fluid, sometimes at very high pressure, through the crevice which commonly exists when two rigid parts are joined or placed in juxtaposition, and for best results the packing should contact a substantial area of one or another of said rigid parts between which it is interposed. Thus, whereas a packing of circular cross section may be admissible under some special conditions, it is preferable for most purposes to employ a non-circular packing thereby to avoid a mere line contact and to insure adequate protection against leakage. Moreover to prevent localized disintegration and blowing out of the packing when subjected to high pressure, it is requisite that the packing be resistant to tearing but at the same time so flexible as to permit it to be employed in joints of substantially any contour or radius of curvature.

Furthermore, since it is quite common to provide the parts constituting the joint with a channel or channels of definite predetermined dimensions for the reception of the packing, it is desirable to provide packing characterized by substantial uniformity of mass, tensile elongation, and lateral compressibility and having a cross-sectional contour generally similar to that of the channel in which the packing is to be employed, such characteristics insuring uniformity of performance at all parts of the joint and a reasonable expectation that any portion of the packing, regardless of the length in which it may be produced, may be relied upon to give similar results under any similar circumstances of use.

Thus a further object of the invention is to provide packing having the above characteristics of strength, toughness and flexibility as well as substantial uniformity of mass, tensile elongation, and lateral compressibility, and having a cross-sectional contour preferably non-circular and in general corresponding to that of the space in which the packing will be used.

Under some conditions of use such a packing may be exposed to the attacks of microorganisms such as cause mould or mildew and consequent weakening of the organic fiber structure, and a further object of the invention is to provide packing of this type consisting, as above suggested, wholly or in major part at least, of cellulosic material, for instance paper fiber, but so protected against the effects of moisture and microorganisms that it will retain its initial strength for a long period of use even when exposed to adverse conditions such, for instance, as warmth and moisture.

Other and further objects and advantages of the invention will be pointed out in the following more detailed description and by reference to the accompanying drawing, wherein Fig. 1 is a plan view of a short length of the improved packing of the present invention, illustrating an embodiment in which a resilient core or stuffer is enclosed in a braided jacket which maintains the initial cross-sectional shape of the packing and which imparts a high degree of tensile strength to the packing;

Fig. 2 is a diagrammatic section on the line 2—2 of Fig. 1, indicating the structure of the completed packing in one desirable embodiment thereof;

Fig. 3 is a section similar to Fig. 2, but indicating the construction before the packing has been impregnated with the moistureproofing and mildew-resistant medium;

Fig. 4 is a diagram illustrative of various cross-sectional shapes which may be given to the packing;

Fig. 5 is a plan view showing a short section (to very large scale) of one of the strands which may be employed in forming the jacket for the packing;

Fig. 6 is a section on the line 6—6 of Fig. 5;

Fig. 7 is a typical transverse section illustrating the structure of the core before the outer jacket is applied;

Fig. 8 is a view generally similar to Fig. 1, but illustrating a modified construction;

Fig. 9 is another view generally similar to Fig. 1, illustrating a further modification;

Fig. 10 is a fragmentary elevation illustrating packing of a further modified form; and Fig. 11 is a fragmentary diametrical section illustrating a joint between a pair of complemental tubular members with the packing of the present invention interposed between said members.

Referring to the drawing, the numeral 1 designates packing of a desirable form made in accordance with the present invention. This packing may be produced in any desired length, and when completed is so flexible that it may be rolled or coiled for convenience in handling. This packing comprises a core or stuffer 2 and an outer jacket 3. The core, as illustrated in Figs. 1 to 3 and 7, comprises crumped or folded paper preferably folded to form longitudinally extending folds or plies. This paper may be either tissue paper or heavy paper such as Kraft paper, and may be plain or creped as desired, and the transverse section of the core may comprise one or more sheets of this paper. Preferably, in forming the core, the paper is drawn through a trumpet-guide which gathers it together laterally and forms it into more or less irregular folds F (Fig. 7).

The jacket 3, as illustrated in Fig. 1, consists of interbraided cords or twines 3a. Preferably these cords or twines are hard twisted paper cords or twines, each of said cords or twines consisting, for example, of a ribbon R of heavy paper (either plain or creped) or of thin tissue paper (plain or creped) twisted upon itself or twisted with another or other ribbons so as to form a solid, hard and very strong cord or twine. While it is possible to make an acceptable packing by concatenating the cords or twines 3a by other methods, for instance by weaving, it is preferred to concatenate them by a braiding operation, since it is possible, in a braiding operation, to impart substantially the desired permanent cross-sectional contour and dimensions to the cord by causing the material to pass through a braiding die of the desired contour as the braiding operation takes place. Further, such a tubular braided jacket, enclosing a core is strongly resistant to elongation and is substantially devoid of tendency to twist. In the practice of the invention the material forming the yieldable core or stuffer 2 may be passed through a trumpet-guide thereby to fold or crinkle the sheet material and reduce it substantially to the desired transverse dimensions and then to cause this material to pass through a hollow braiding die while the jacket is braided about it. By using a die of the proper contour and dimensions the cords 3a are so interlaid and entwined with one another that when the completed material emerges from the braiding die it has the desired and substantially permanent cross-sectional shape and dimensions.

In accordance with the present invention the core 2 and its jacket 3 (or one of the other of said parts) is or are coated or preferably impregnated with a material M which is resistant or repellent to moisture and to the action of microorganism such for instance as those which cause mildew or rotting. This coating or impregnant material may be applied to the cords 3a before braiding or to the paper forming the core before the paper is folded or crinkled, or the impregnant or coating material may be applied during the braiding operation or subsequently thereto. Preferably this impregnant or coating material comprises waxy material such as paraffin, or some other moisture-repellent or resistant substance, for instance oils, either vegetable or mineral, and associated with this moisture-resistant or repellent material is a substance which inhibits the action of microorganisms, for example formaldehyde, aluminum acetate, cuprammonium solution, cerium acetate, colloidal copper oxide, or other well-known substances having similar properties.

In Fig. 11 the improved packing of the invention is shown disposed in a channel 4 of substantially rectangular contour formed between two parts 5 and 6 of tubular construction, the part 5 having screw-threaded engagement with the part 6 so as thereby to compress the packing 1 within the channel 4 and to provide a leak-proof joint between the parts. Obviously the packing 1 may be employed in other similar or dissimilar arrangements wherever it is desired to prevent leakage between two substantially rigid parts which are mechanically united or joined.

In the arrangement shown in Figs. 1, 2 and 3, the packing is of generally rectangular contour, in fact nearly square, but with rounded corners. In Fig. 4 other cross-sectional shapes of packing are illustrated merely by way of suggestion of the numberless shapes which might be employed. Thus in this figure the packing 1a is of triangular form, the packing 1b is of elongate rectangular form and the packing 1c is a partial segment of a circle. However, in each instance the packing comprises a core which is transversely yieldable and resilient and an outer jacket consisting of concatenated strands or cords so arranged as to resist elongation of the packing and to preserve the desired cross-sectional shape of the core.

While in Figs. 2, 3 and 7 the core is shown as consisting essentially of longitudinally extending folds or plies of paper, it is contemplated that the core may be otherwise formed. Thus for example in Fig. 8, the core consists of a bundle of cords 6 which, if desired may be of the same character as the cords 3a above described. These cords may all be alike if desired, both as to the material from which they are made and as to size, or they may be of different diameters and individually made of paper of different character, for example some may be made of heavy paper and others of tissue paper, etc.

As illustrated in Fig. 9, the core comprises ribbons 7 of paper and hand twisted cords 3a. Obviously other forms of core may be employed, as for example a core 8 (Fig. 10) of cellulose fiber unspun and untwisted, for instance carded fiber in bat form rolled or transversely crumpled, or merely in the form of a heavy sliver or a plurality of such slivers in Figs. 8 and 9 the jacket-forming strands are shown as braided substantially as closely as possible.

While certain desirable embodiments of the invention have been suggested by way of example, it is to be understood that the invention is not necessarily restricted to these precise embodiments but is to be regarded as broadly inclusive of any and all equivalents falling within the scope of the appended claims.

I claim:

1. Packing material for use in pipe joints or the like and capable of withstanding heavy fluid pressure without blowing out and of production in great lengths from which desired portions may be cut to form individual joint packings, said packing material being of noncircular transverse section such as closely to conform to the packing-receiving recess of the joint in which it is to be used, said packing material being pliable and capable of bending without breaking and including a core comprising flexible sheet material gathered together to form a plurality of longitudinally extending folds, and a jacket closely confining said core and holding it under transverse compression, said jacket consisting of solid, hard and strong strands of twisted paper, the paper strands being closely braided substantially to conform to the desired non-circular section of the packing, the packing also comprising an impregnant medium including a waxy, moisture resistant substance and a mildew repellent, the packing being characterized by substantial uniformity of mass, resistance to tensile elongation and lateral compressibility and being substantially devoid of tendency to twist.

2. Packing material for use in pipe joints or the like and capable of withstanding heavy fluid pressure and of production in great lengths, from which desired portions may be cut to form individual joint packings, and which will not support nor encourage bacterial growth, said packing consisting of lengths of sheet paper which extend longitudinally of the packing, some of said lengths being so associated as to form a core and others of which are associated to form a core-enveloping jacket, respectively, those lengths of paper which constitute the jacket, at least, being hard twisted to form strong cords and said cords being concatenated to form a close tubular braid, the jacket and core being pliable and capable of bending without breaking and the jacket closely confining the core and holding the latter under transverse compression, the packing being characterized by substantial uniformity of mass, resistance to tensile elongation, and lateral compressibility, and being substantially devoid of tendency to twist.

3. Packing material for use in pipe joints and capable of production in great lengths, from which desired portions may be cut to form individual joint packings, and which will not support nor encourage bacterial growth, said packing comprising lengths of flexible sheet paper assembled to form a core and a core-enveloping jacket, respectively, the lengths of paper which constitute both core and jacket being hard twisted to form strong cords, the core comprising a plurality of such cords disposed to extend longitudinally of the packing and the jacket comprising a plurality of such cords concatenated to form a tubular braid, the packing material being pliable and capable of bending without breaking and the jacket closely confining the core and holding it under transverse compression, the packing comprising an impregnant moisture resistant substance, the packing being characterized by substantial uniformity of mass, and resistance to tensile elongation and lateral compressibility.

HENRY W. BUHLER.